United States Patent
Tischer et al.

(10) Patent No.: US 6,222,360 B1
(45) Date of Patent: Apr. 24, 2001

(54) ARRANGEMENT FOR DETERMINING THE POSITION OF AN OBJECT OF MEASUREMENT WITHOUT CONTACTING THE OBJECT

(75) Inventors: Dieter Tischer, Wendlingen; Alfred Trzmiel, Grafenberg, both of (DE)

(73) Assignee: Hydraulik-Ring GmbH (DE)

( * ) Notice: Subject to any disclaimer, the term of this patent is extended or adjusted under 35 U.S.C. 154(b) by 0 days.

(21) Appl. No.: 09/249,687

(22) Filed: Feb. 12, 1999

(30) Foreign Application Priority Data

Feb. 12, 1998 (DE) ................................ 198 05 621

(51) Int. Cl.$^7$ ............................................. G01B 7/30
(52) U.S. Cl. ................. 324/207.18; 324/207.24; 324/207.17
(58) Field of Search .............. 324/207.18, 207.17, 324/207.19, 207.13, 207.24; 340/870.36

(56) References Cited

FOREIGN PATENT DOCUMENTS

936443 * 8/1999 (EP) .

* cited by examiner

Primary Examiner—Jay Patidar
Assistant Examiner—Amber Knox
(74) Attorney, Agent, or Firm—Robert W. Becker & Associates

(57) ABSTRACT

An arrangement is provided for determining the position of an object of measurement without contacting the object. The arrangement includes a sensor element that reacts to magnetic forces, and along which the object can be displaced. The sensor element is provided with at least one release element, which has two magnets that are fixed relative to one anther, are spaced from one anther, and are disposed in a vicinity adjacent to the sensor element. One of the magnets, in order to produce a unilaterally enlarged virtual air gap, is rotated by a given angle relative to the other magnet.

26 Claims, 3 Drawing Sheets

ARRANGEMENT FOR DETERMINING THE POSITION OF AN OBJECT OF MEASUREMENT WITHOUT CONTACTING THE OBJECT

BACKGROUND OF THE INVENTION

The present invention relates to an arrangement for determining the position of an object of measurement, preferably a control shaft of a motor vehicle or gear mechanism, without contacting the object. The arrangement includes a sensor element that reacts to magnetic forces and along which the object can be displaced, the sensor element being provided with at least one release element.

With the known arrangement of this type (DE 44 25 904 A1), a magnetic path sensor is provided for determining the position of an object of measurement; this sensor is movable, without contacting the object, along a rod-like magnetic core having a measurement winding that extends over the entire length of the path that is to be determined. The object of measurement saturates the magnetic core at a location adjacent to the object of measurement and thus generates a virtual air gap. Disposed at the ends of the magnetic core are two further coils that are connected in series; connected after the coils is an analyzer for determining the induced differential voltage, from which the position of the object of measurement can be derived. A constant power source serves for energizing the measurement winding with an alternating current of constant amplitude. The path sensor is, however, merely suitable for determining one-dimensional movements. In order to be able to carry out a multi-dimensional position determination, for example a two-dimensional determination, a second sensor of this type is required, with at least one of the two sensors being coupled directly, or via a suitable mechanism, to the object of measurement. With a direct coupling of a sensor to the object of measurement, additional measurement leads are also required for transmitting the sensor signals.

It is therefore an object of the present invention to improve the aforementioned type of arrangement so that it is possible, in a structurally straightforward manner, to obtain therewith an at least two-dimensional position determination of an object of measurement.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
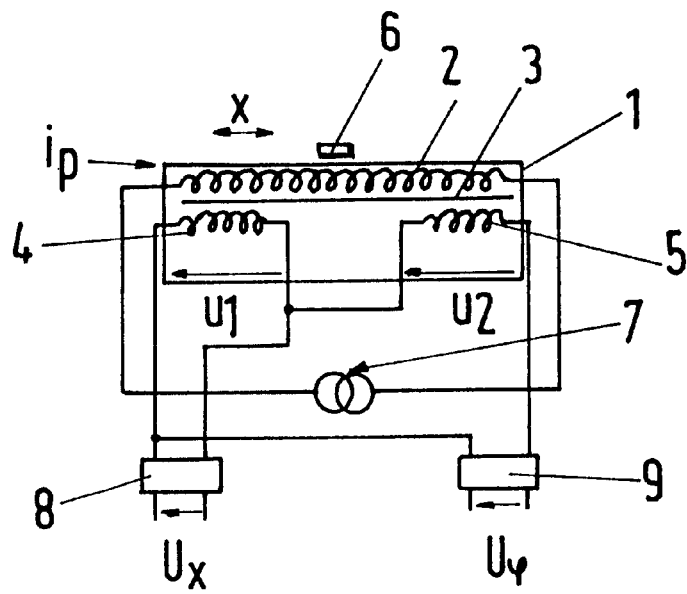
FIG. 1 is a basic circuit diagram of one exemplary embodiment of the inventive arrangement.

The arrangement of the present invention is characterized primarily in that the release element has two magnets that are fixed relative to one anther, are spaced from one another, and are disposed in the vicinity adjacent to the sensor element, wherein one of the elements, in order to produce a unilaterally enlarged virtual air gap, is rotated by a given angle relative to the other magnet.

With the inventive arrangement it is merely necessary to have a single release element with the two magnets in order to determine the position of the object of measurement in at least two dimensions. Thus, with the object of measurement a translatory and a rotational movement can be determined with the release element. Due to the fact that the directions of magnetization of the two magnets differ from one another, there results a magnetic field having an effective range that is enlarged within a limited angular range by rotating the release element. The enlargement of the virtual air gap thereby changes in only one direction. To ensure that the overlapping magnetic fields given off by the two magnets have approximately the same magnitudes in the vicinity of the sensor element, the capacities and relative sizes of the magnets must be coordinated with one another. The angular difference between the directions of magnetization of the two magnets should be of such a magnitude that reciprocal effects between the magnets that are too great are precluded, and that the enlargement of the virtual air gap is consequently effected in merely one direction.

With the inventive arrangement, the displacement determination is advantageously effected by analyzing a voltage induced at a first secondary winding of the sensor element, whereas the angle information can be derived from an induced differential voltage between the first and a second secondary winding. In one advantageous specific embodiment, the first secondary winding is therefore followed by a first rectifier to determine a first measurement, and a second rectifier follows a series arrangement of the two secondary windings to determine a second measurement. The two rectifiers are preferably peak value rectifiers in order to realize as high a quality of the measurement signals as possible. Thus, an expensive and complicated electronic analyzing circuitry for preparing and analyzing the measurement results is not necessary. Pursuant to one advantageous specific embodiment, the primary winding of the sensor element is energized by means of a triangular or delta alternating current. This offers the advantage that in particular for applications in motor vehicles, low effective current values are possible in order to ensure an adequate energizing of the primary winding.

The sensor element is advantageously provided with a measurement coil that extends parallel to the direction of displacement of the object of measurement. The measurement coil advantageously has a core of soft magnetic material.

The core preferably comprises on the one hand an elongated strip of soft-magnetic, crystalline material, and on the other hand at least one strip of amorphous or noncrystalline material. The strip of soft-magnetic material and the amorphous and nanocrystalline strips can be interconnected in a simple manner by the surrounding primary coil. As an alternative to the aforementioned core materials, it is also possible to use cores of combined polymeric material. All of the aforementioned possibilities serve to improve the sensitivity to interference as a result of the action of constant fields. As a result, even relatively large constant fields do not lead to a saturation of the core and the shifting of the virtual air gap associated therewith.

In order even with the translatory movement as well as with the rotational movement of the object of measurement to enable adequate voltage dispersion at the two secondary windings, the frequency of the alternating current that is impressed upon the primary coil should be between 3 kHz and 5 kHz, and the effective value of the alternating current should be between 5 mA and 20 mA.

Further specific features of the present invention will be described in detail subsequently.

DESCRIPTION OF THE PREFERRED EMBODIMENTS

Referring now to the drawings in detail, the basic circuit diagram of FIG. 1 shows a coil 1 as a sensor element, and a release element 6 that generates a virtual air gap in a core 3 that is axially disposed in the coil 1 and is made of soft magnetic material. The release element 6 can be shifted in the direction "x" parallel to the axis 14 of the coil 1, and can be rotated about the displacement axis. The coil 1 is furthermore provided with a primary winding 2, which is energized by an alternating current $i_P$ produced from a source of power 7, and two secondary windings 4 and 5 that have opposite winding directions. The potentials $u_1$ and $u_2$ induced in the secondary windings 4 and 5 are a function of the position and the extent of the virtual air gap produced by the release element 6. A first induced potential $u_1$ is fed to a first rectifier 8, which on the output side delivers a direct current $U_x$, the magnitude of which is proportional to the position of the release element 6 (see FIG. 4). The difference of the potential $u_1$ and $u_2$ induced at the secondary windings 4 and 5 is supplied to a second rectifier 9. The formation of the difference or differential is effected by a series arrangement of the two secondary windings 4 and 5 accompanied by opposite winding directions thereof. The rectified differential voltage $U_\phi$ is nearly proportional to the angular position $\phi$ of the release elements (see FIG. 5). Not only the translational but also the rotational axis of the release element 6 are in this embodiment parallel to the axis 14 of the coil 1.

Figure 2:
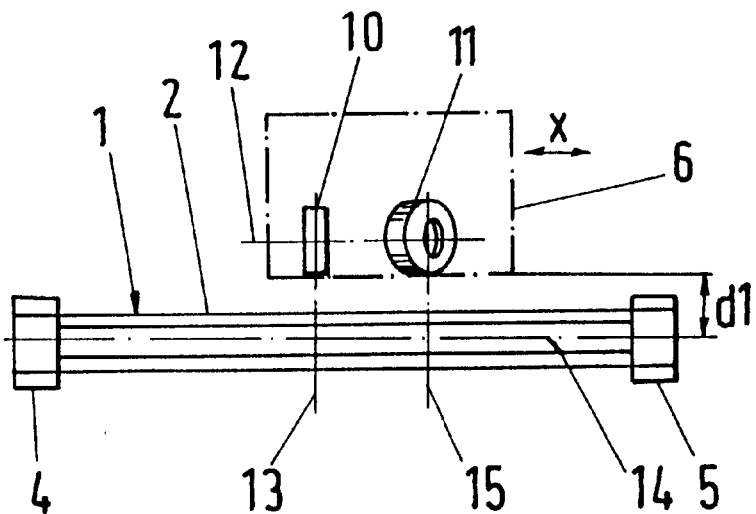
FIG. 2 is a side view of a sensor and release element of one exemplary embodiment of the inventive arrangement.

With the aid of FIG. 2, it can be seen that a first annular magnet 10 of the release element 6 is spaced by a distance d1 from the coil axis 14. The coil 1 is preferably surrounded over its entire length by the primary winding 2, whereas the secondary windings 4 and 5 are advantageously disposed only at the ends of the coil 1, where they surround the primary coil 2 (see also FIG. 3). The secondary windings 4, 5 are spaced from one another by a distance that corresponds at least to the maximum translatory displacement path of the release element 6.

Figure 3:
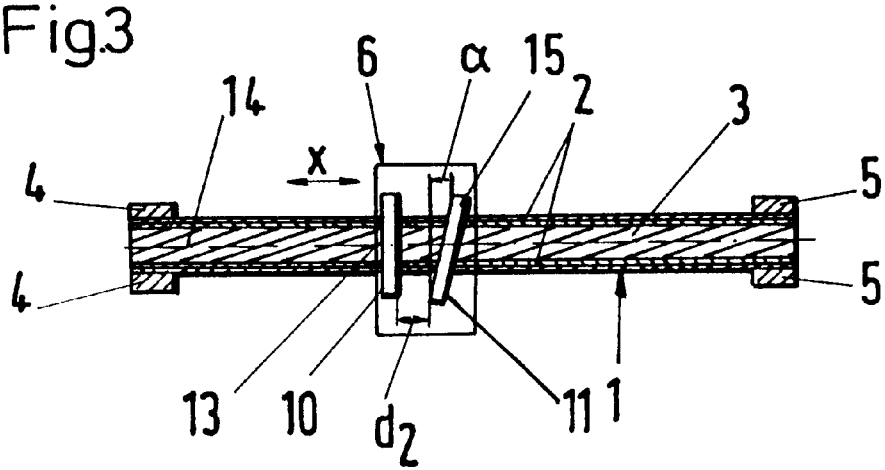
FIG. 3 is a top view of the sensor and release element of FIG. 2, with the sensor element being shown in cross-section.

FIG. 3 is a top view of the release element 6, with two annular magnets 10 and 11, and a sectional view of the coil 1. It should be noted that in place of annular magnets it is also in principle possible to use bar magnets, although only to determine relatively small rotational angles $\phi$. The annular magnets 10 and 11 are magnetized in an axial direction. The two annular magnets 10, 11 are disposed in a region next to the coil 1. A first annular magnet 10 is disposed in a plane perpendicular to the axis 14 of the coil 1, so that the axis 12 of the annular magnet 10 is parallel to the coil axis 14. As can be seen from FIG. 2, the annular magnet 10 is disposed in such a way relative to the coil 1 that a central axis 13 of the annular magnet 10, which is perpendicular to the magnet axis 12, intersects the coil axis 14. The second annular magnet 11 is rotated relative to the first annular magnet 10 by an angle $\alpha$ about an axis 15 that is parallel to the central axis 13. The axis 15 also intersects the coil axis 14. The two annular magnets 10, 11 are spaced from one another by the distance $d_2$.

Figure 4:
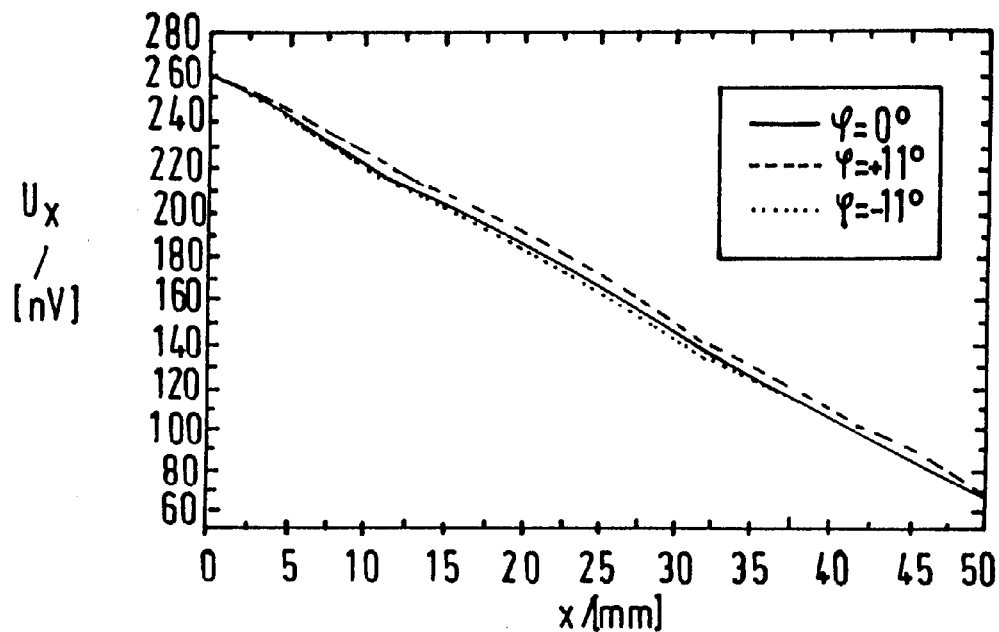
FIGS. 4 and 5 are graphs showing the relationship of the measurement signals of the sensor element and the position of the release element.

FIG. 4 shows the relationship of the current or potential $U_x$ with the position "x" of an object of measurement, on which is provided the release element 6, for three different angular positions ($\phi=0°$, $\phi=+11°$, $\phi=-11°$). Over the entire measurement range of the position "x", there is a voltage drop of 200 mV. The voltage $U_x$ decreases nearly linearly as the linear displacement "x" increases, and is thereby for the most part not affected by the angular position $\phi$.

Figure 5:
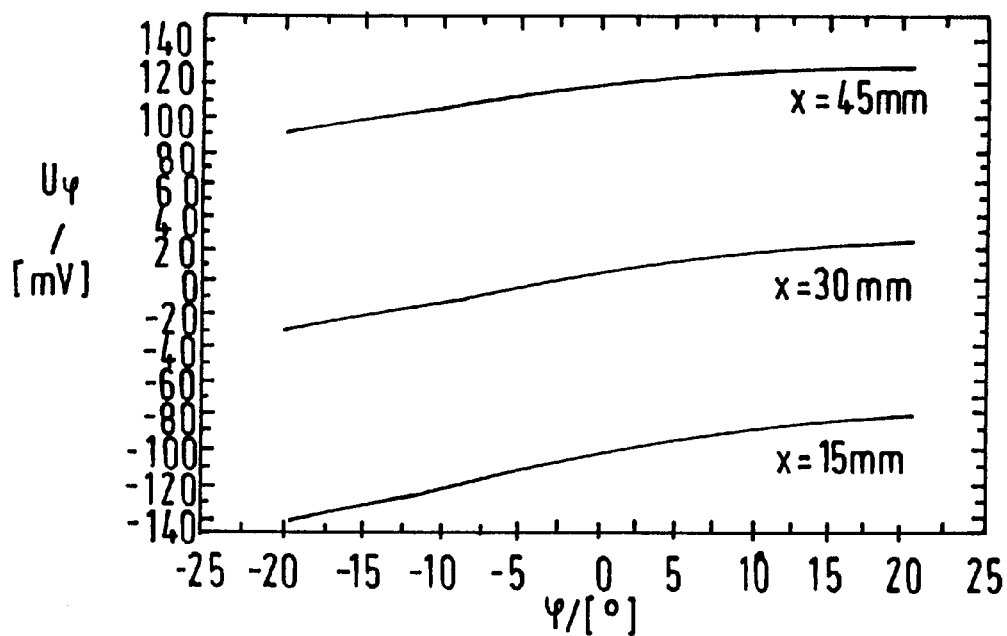

As can be seen from FIG. 5, variations of the angular position $\phi$ of the object of measurement in the range of $-20°$ to $20°$ produced at the voltage $U_\phi$, voltage variations of at least 20 mV. The relationship of the voltage $U_\phi$ relative to the angular position $\phi$ of the object of measurement is illustrated for three different positions (x=15 mm, x=30 mm, x=45 mm). For a fixed position "x", there is a nearly linear relationship between the differential voltage $U_\phi$ and the angular position $\phi$. The influence of the position "x" upon the voltage $U_\phi$ can be eliminated, for example, by the formation of a summation signal or by a simple subordinated adjustment.

Figures 6, 7:
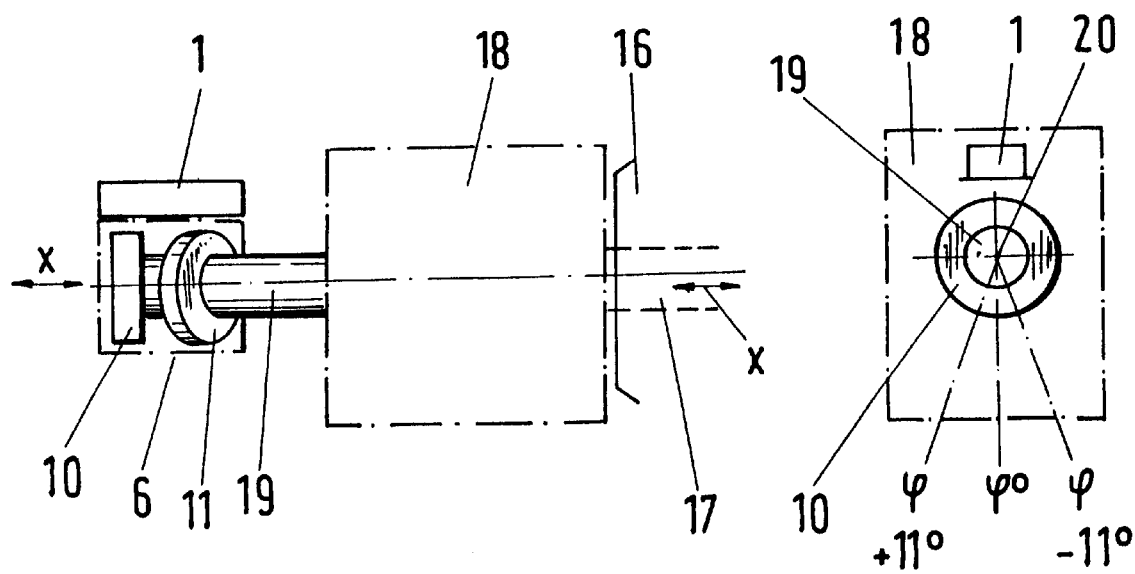
FIG. 6 is a side view of the inventive arrangement in conjunction with a control shaft of a motor vehicle gearshift mechanism.
FIG. 7 is a front view of the arrangement of FIG. 6.

FIGS. 6 and 7 schematically illustrate one application of the inventive arrangement. This arrangement can advantageously be utilized with control mechanisms for the automation of manual gearshift mechanisms of motor vehicles. Such control mechanisms are described, for example, in DE 196 10 491. In order with a control mechanism to call up the channels and engage the gears, a control shaft is displaced axially as well as rotated about its axis. FIG. 6 shows the manual gearshift mechanism 16, the control 17 of which is coupled with a gear actuator 18. Within the gear actuator 18, the control shaft 17 is coupled with an extension 19 that projects out of the gear actuator 18. It is, of course, also possible to make the control shaft 17 continuous. The extension or control shaft 19 forms the object of measurement, upon which the release element 6 is disposed. This release element has the two annular magnets 10 and 11 that in the manner described are fixedly disposed upon the control shaft 17 or its extension 19. Disposed across from the release element 6 is the sensor element 1 in the form of the coil. The control shaft 17/19 can be shifted axially in the "x" direction and can be rotated about its axis 20 about the angle $\phi$. By way of example, FIG. 7 shows angles of rotation $\phi$ of +11° and −11°. By displacing the control shaft 17/19 in the "x" direction, the position "x" is determined via the voltage $U_x$, as shown in FIG. 4. If the control shaft 17/19 is rotated about its axis 20, the angle of rotation can be easily determined from the differential voltage $U_\phi$ at the respective position "x", as illustrated in FIG. 5. As described in detail in DE 196 10 491, the described displacement and rotational movement of the control shaft 17/19 is then converted in such a way that the desired gears are engaged or the desired channels of the gear mechanism are called.

The magnets 10, 11 need not necessarily be annular. Since the angle of rotation $\phi$ of the control shaft 17/19 is effected over only a certain angular range, it is sufficient for the magnets 10, 11 to have the shape of a partial ring.

The specification incorporates by reference the disclosure of German priority document 198 05 621.4 of Feb. 12, 1998.

The present invention is, of course, in no way restricted to the specific disclosure of the specification and drawings, but also encompasses any modifications within the scope of the appended claims.

What is claimed is:

1. An arrangement for determining the position of an object of measurement without contacting the object, comprising:

a sensor element that reacts to magnetic forces, and along which said object can be displaced, said sensor element being provided with at least one release element, which has two magnets that are fixed relative to one another, are spaced from one another, and are disposed in a vicinity adjacent to said sensor element, wherein one of said magnets, in order to produce a unilaterally enlarged virtual air gap, is rotated by a given angle α relative to the other of said magnets.

2. An arrangement according to claim 1, wherein said two magnets have a shape of at least part of a ring, and are preferably annular magnets.

3. An arrangement according to claim 2, wherein said two magnets have the same configuration.

4. An arrangement according to claim 1, wherein said sensor element is provided with a measurement coil that extends parallel to a direction of displacement x of said object of measurement.

5. An arrangement according to claim 4, wherein said measurement coil is provided with a primary winding that is connected to a power source, preferably an alternating current source.

6. An arrangement according to claim 5, wherein two secondary windings are disposed on said primary winding, and wherein said secondary windings are spaced from one another by a distance that is adapted to a maximum displacement movement of said object of measurement.

7. An arrangement according to claim 6, wherein said two secondary windings are provided with opposite directions of winding.

8. An arrangement according to claim 6, wherein said two secondary windings are connected in series.

9. An arrangement according to claim 6, wherein said measurement coil is provided with a core of soft magnetic material.

10. An arrangement according to claim 9, wherein said release element is disposed adjacent to said object of measurement for saturation of said core.

11. An arrangement according to claim 6, wherein said two magnets are disposed at a distance $d_1$ from an axis of said measurement coil.

12. An arrangement according to claim 6, wherein one of said magnets is disposed in such a way that an axis thereof extends parallel to an axis of said sensor element.

13. An arrangement according to claim 12, wherein a central axis of said one magnet is disposed perpendicular to said axis of that magnet and intersects said axis of said sensor element.

14. An arrangement according to claim 13, wherein said other magnet is rotated by said given angle α relative to said first magnet about an axis that extends parallel to said central axis of said first magnet.

15. An arrangement according to claim 14, wherein said axis of said second magnet intersects said axis of said sensor element.

16. An arrangement according to claim 6, wherein an axis of said sensor element extends parallel to a rotational axis of movement of said object of measurement.

17. An arrangement according to claim 6, wherein an axis of said sensor element extends perpendicular to a rotational axis of movement of said object of measurement.

18. An arrangement according to claim 6, which includes a first rectifier that follows one of said secondary coils to determine an induced voltage $U_x$ as a first measured value.

19. An arrangement according to claim 18, which includes a second rectifier that follows a series connection of said two secondary coils to determine an induced differential voltage $U_\phi$ as a second measured value.

20. An arrangement according to claim 19, wherein said two rectifiers are provided with means for peak value rectification.

21. An arrangement according to claim 6, wherein said power source that is connected to said primary winding is provided with means for producing a triangular alternating current $i_P$.

22. An arrangement according to claim 9, wherein said core comprises an elongated strip of soft-magnetic crystalline material and at least one strip of amorphous material.

23. An arrangement according to claim 9, wherein said core comprises an elongated strip of soft-magnetic crystalline material and at least one strip of noncrystalline material.

24. An arrangement according to claim 9, wherein said core is made of combined polymeric material.

25. An arrangement according to claim 6, wherein an alternating current $i_P$ is impressed upon said primary winding and has a frequency of between 3 and 5 kHz.

26. An arrangement according to claim 6, wherein an alternating current $i_P$ is impressed upon said primary winding and has an effective valve of between 5 and 20 mK.

* * * * *

UNITED STATES PATENT AND TRADEMARK OFFICE
CERTIFICATE OF CORRECTION

PATENT NO. : 6,222,360 B1
DATED : April 24, 2001
INVENTOR(S) : Tischer et al.

It is certified that error appears in the above-identified patent and that said Letters Patent is hereby corrected as shown below:

<u>Title page,</u>
Item [57], should read as follows:

[57], ABSTRACT
An arrangement is provided for determining the position of an object of measurement without contacting the object. The arrangement includes a sensor element that reacts to magnetic forces, and along which the object can be be displaced. The sensor element is provided with at least one release element, which has two magnets that are fixed relative to one another, are spaced from one another, and are disposed in a vicinity adjacent to the sensor element. One of the magnets, in order to produce a unilaterally enlarged virtual air gap, is rotated by a given angle relative to the other magnet.

Signed and Sealed this

Fifth Day of March, 2002

*Attest:*

JAMES E. ROGAN
*Director of the United States Patent and Trademark Office*

*Attesting Officer*